United States Patent
Miao

(10) Patent No.: US 11,167,689 B2
(45) Date of Patent: Nov. 9, 2021

(54) PROJECTION APPARATUS AND CONTROL METHOD

(71) Applicant: Coretronic Corporation, Hsin-Chu (TW)

(72) Inventor: Yun-Lin Miao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/133,546

(22) Filed: Dec. 23, 2020

(65) Prior Publication Data

US 2021/0197713 A1 Jul. 1, 2021

(30) Foreign Application Priority Data

Dec. 30, 2019 (CN) .......................... 201911401261.3

(51) Int. Cl.
*B60Q 1/32* (2006.01)
*B60Q 1/24* (2006.01)

(52) U.S. Cl.
CPC .............. *B60Q 1/323* (2013.01); *B60Q 1/24* (2013.01); *B60Q 2400/40* (2013.01); *B60Q 2400/50* (2013.01)

(58) Field of Classification Search
CPC .................... B60Q 1/24–245; B60Q 1/32–326
USPC .......................................... 362/501, 540–549
See application file for complete search history.

(56) References Cited

U.S. PATENT DOCUMENTS

| 8,322,863 B1 | 12/2012 | Cho et al. |
| 2011/0115375 A1 | 5/2011 | Shiratsuchi et al. |
| 2017/0050558 A1 | 2/2017 | Salter et al. |
| 2017/0371235 A1 | 12/2017 | Yokoyama et al. |
| 2019/0202347 A1* | 7/2019 | Salter ................ F21S 43/14 |
| 2019/0299848 A1 | 10/2019 | Mori et al. |
| 2019/0324362 A1 | 10/2019 | Favero et al. |

FOREIGN PATENT DOCUMENTS

| CN | 206929717 | 1/2018 |
| DE | 102015220911 | 4/2017 |
| DE | 102016122856 | 5/2018 |
| FR | 3062613 | 8/2018 |
| JP | 2015221659 | 12/2015 |

OTHER PUBLICATIONS

"Search Report of Europe Counterpart Application", dated Jun. 4, 2021, pp. 1-9.

* cited by examiner

*Primary Examiner* — Jason M Han
(74) *Attorney, Agent, or Firm* — JCIPRNET

(57) ABSTRACT

The invention provides a projection apparatus configured to be disposed on a vehicle door, and a control method of the projection apparatus. The projection apparatus includes an illumination source, a projection display apparatus and a controller. The illumination source is configured to provide an illumination beam. The projection display apparatus is disposed on a transmission path of the illumination beam, and is configured to convert the illumination beam into a projection beam. The controller is coupled to the projection display apparatus. The controller determines whether the vehicle door is a first vehicle door or a second vehicle door according to an opening operation of the vehicle door, and correspondingly causes the projection beam to display an image.

16 Claims, 7 Drawing Sheets

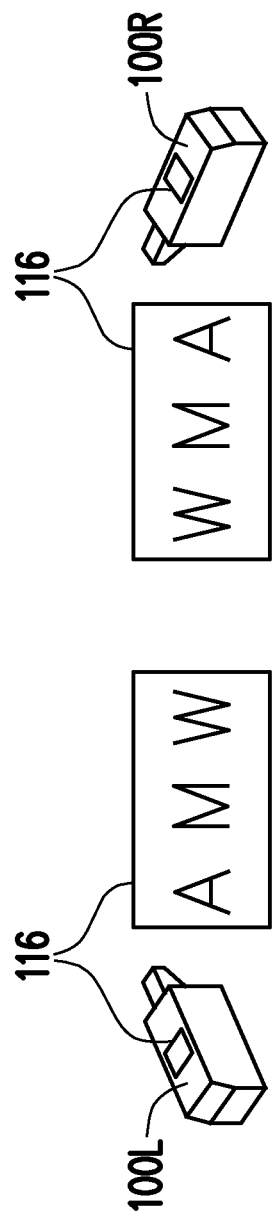

PROJECTION APPARATUS AND CONTROL METHOD

CROSS-REFERENCE TO RELATED APPLICATION

This application claims the priority benefit of China application serial no. 201911401261.3, filed on Dec. 30, 2019. The entirety of the above-mentioned patent application is hereby incorporated by reference herein and made a part of this specification.

BACKGROUND

Technical Field

The disclosure relates to a projection technology, and in particular, to a projection apparatus and a control method of the projection apparatus.

Description of Related Art

Currently, puddle lamps are mounted on many vehicles for auxiliary lighting, so that people getting on or getting off a vehicle may pay attention to ground situations to avoid stepping on a dangerous area or dirt accidently. For aesthetics, brand display, or an indication function, beams emitted by some puddle lamps may further form a pattern or an image on the ground. However, because a vehicle has vehicle doors with different open directions on the left and right, if optimal view experience is to be provided to passengers getting on or getting off the vehicle or a driver, it is expected that the vehicle doors on left and right correspondingly project image contents with a same display effect corresponding to the different left and right directions.

However, in the related art, considering the costs, the structure design of the puddle lamps is very simple. As a result, when a bill of materials (BOM) of product design and the puddle lamp production lines are designed, the production lines are divided into a puddle lamp production line for left vehicle doors and a puddle lamp production line for right vehicle doors, and some material numbers are different, which causes burdens on production, stock, and even future maintenance. Therefore, how to provide a vehicle projection display apparatus with a simple structure, low costs, and dual applicability is one of the to-be-solved issues.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection apparatus and a control method of the projection apparatus, which are applied to a vehicle door of a vehicle and can project proper images according to different installation positions.

Other objectives and benefits of the invention may further be understood from technical features disclosed by the invention.

To achieve one or some or all of the foregoing objectives or other objectives, an embodiment of the invention provides a projection apparatus, which is configured to be disposed on a vehicle door of a vehicle. The projection apparatus includes an illumination source, a projection display apparatus and a controller. The illumination source is configured to provide an illumination beam. The projection display apparatus is disposed on a transmission path of the illumination beam, and is configured to convert the illumination beam into a projection beam. The controller is coupled to the projection display apparatus, determines whether the vehicle door is a first vehicle door or a second vehicle door according to an opening operation of the vehicle door, and correspondingly causes the projection beam to display an image.

To achieve one or some or all of the foregoing objectives or other objectives, another embodiment of the invention provides a control method of a projection apparatus. The projection apparatus is configured to be disposed on a vehicle door of a vehicle. The control method includes the following steps: sensing an opening operation of the vehicle door to generate a vehicle door opening signal; and determining whether the vehicle door is a first vehicle door or a second vehicle door according to the vehicle door opening signal, to correspondingly project an image.

Based on the foregoing, the projection apparatus and the control method of the projection apparatus of the embodiments of the invention may sense opening of the vehicle door to select to project a first image or an adjusted image. Therefore, vehicle doors at different positions may share a same projection apparatus, so as to reduce production costs and simplify stock preparation.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3B is a schematic diagram of adjustment on the projection effects from different view angles in FIG. 3A.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
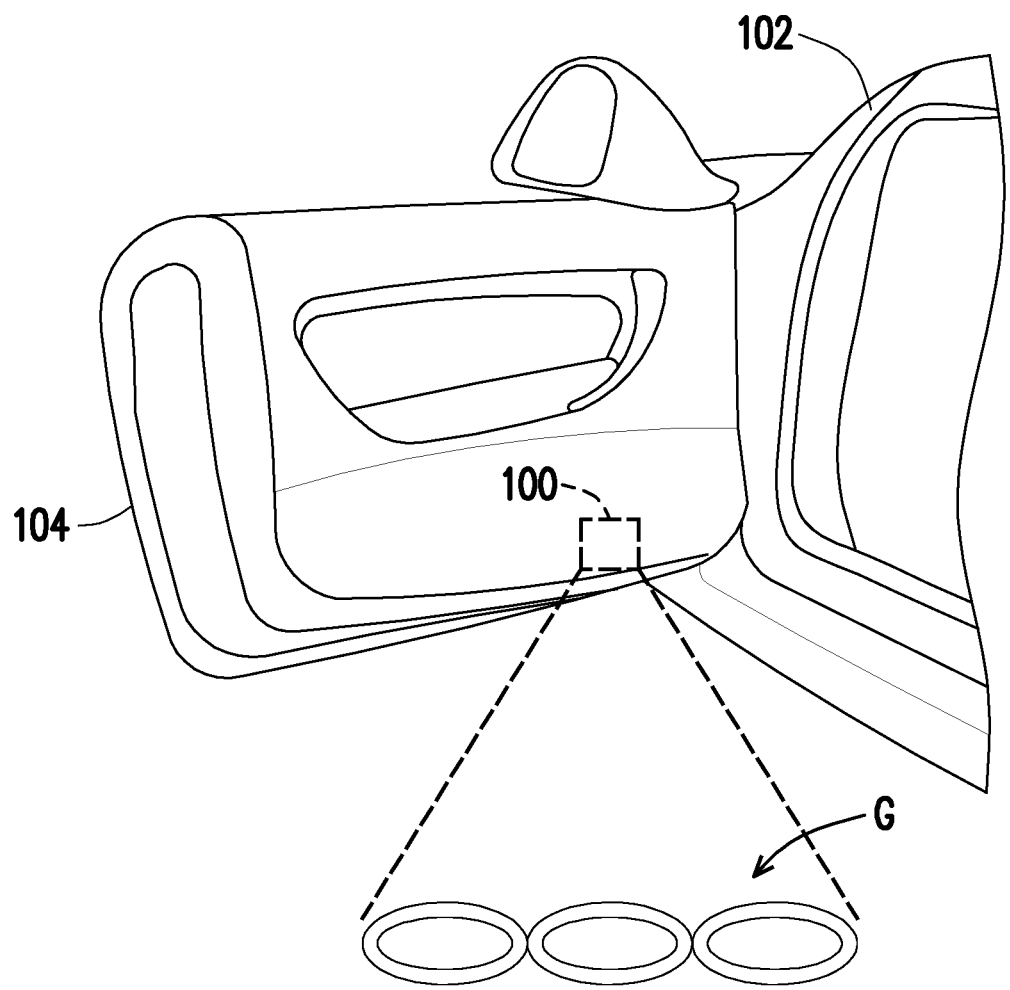
FIG. 1 is a schematic diagram of an effect of a projection apparatus when a vehicle door is open according to an embodiment of the invention.

FIG. 1 is a schematic diagram of an effect of a projection apparatus when a vehicle door is open according to an embodiment of the invention. Referring to FIG. 1, a projection apparatus 100 is configured to be disposed on a vehicle 102 with a plurality of vehicle doors 104. Electrical power of the projection apparatus 100 is from the vehicle 102, and the projection apparatus 100 may be turned on through an opening operation of the vehicle door 104. When the vehicle door 104 is open, the projection apparatus 100 automatically turns on a projection function, and projects an image on a projection surface G, for example, projecting a video, or one or more pictures. In FIG. 1, the projection surface G is the ground. Apart from providing the projection function and a gorgeous light-shadow effect, the projection apparatus 100 in this embodiment may further adjust a content of the image corresponding to a position of the vehicle door 104 in the vehicle 102, so that the projection apparatus 100 may project a content with a most suitable view angle for a passenger no matter which vehicle door the projection apparatus 100 is located.

Implementations of the projection apparatus 100 is further described in the following.

Figure 2:
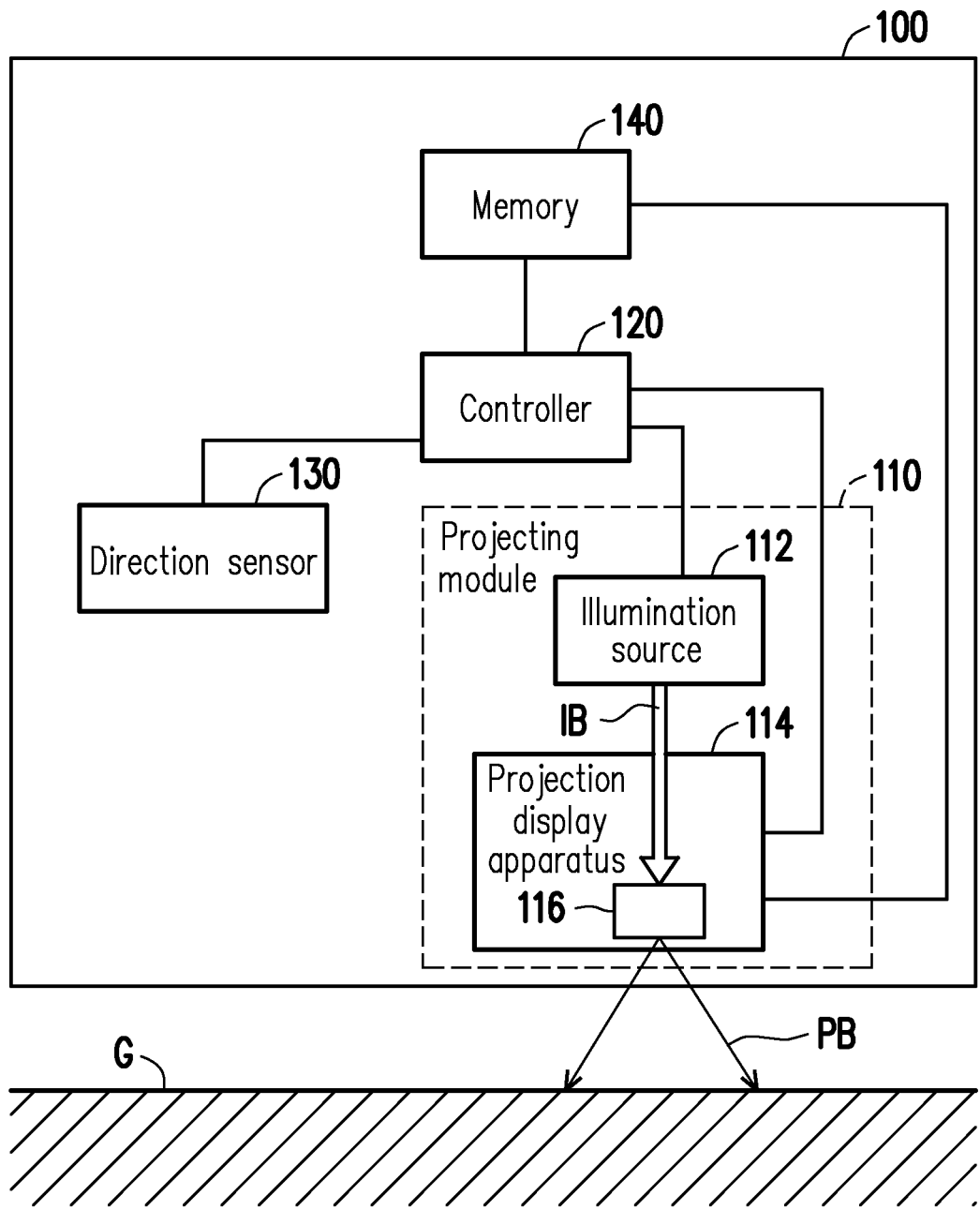
FIG. 2 is a schematic block diagram of a projection apparatus according to an embodiment of the invention.

FIG. 2 is a schematic block diagram of an effect of a projection apparatus according to an embodiment of the invention. Referring to FIG. 2, a projection apparatus 100 at least includes a projecting module 110 and a controller 120, where the projecting module 110 includes an illumination source 112 and a projection display apparatus 114. The illumination source 112 is configured to provide an illumination beam IB. The projection display apparatus 114 is disposed on a transmission path of the illumination beam IB, and is configured to convert the illumination beam IB into a projection beam PB. The controller 120 is coupled to (electrically connected to) the projection display apparatus 114, determines whether the vehicle door 104 is a first vehicle door or a second vehicle door according to an opening operation of the vehicle door 104 in which the projection apparatus 100 is located, and correspondingly causes the projection beam PB to display an image. Specifically, the controller 120 is coupled to the projection display apparatus 114, determines whether the vehicle door 104 is a first vehicle door or a second vehicle door according to an opening operation of the vehicle door 104 in which the projection apparatus 100 is located, and correspondingly causes the projection display apparatus 114 to project the projection beam PB to display a first image or an adjusted image, where the first image and the adjusted image are the same. For example, the first vehicle door and the second vehicle door are located on different sides of the vehicle 102. For example, the first vehicle door is a left vehicle door of the vehicle 102, and the second vehicle door is a right vehicle door of the vehicle 102. When disposed on the first vehicle door, the projection apparatus 100 projects the first image, and when disposed on the second vehicle door, the projection apparatus 100 projects the adjusted image. A display content of the first image and a display content of the adjusted image are respectively projected at lower positions adjacent to the first vehicle door and the second vehicle door. For an observer getting off from the first vehicle door and for an observer getting off from the second vehicle door, the display content of the first image and the display content of the adjusted image are the same.

Figure 3A:
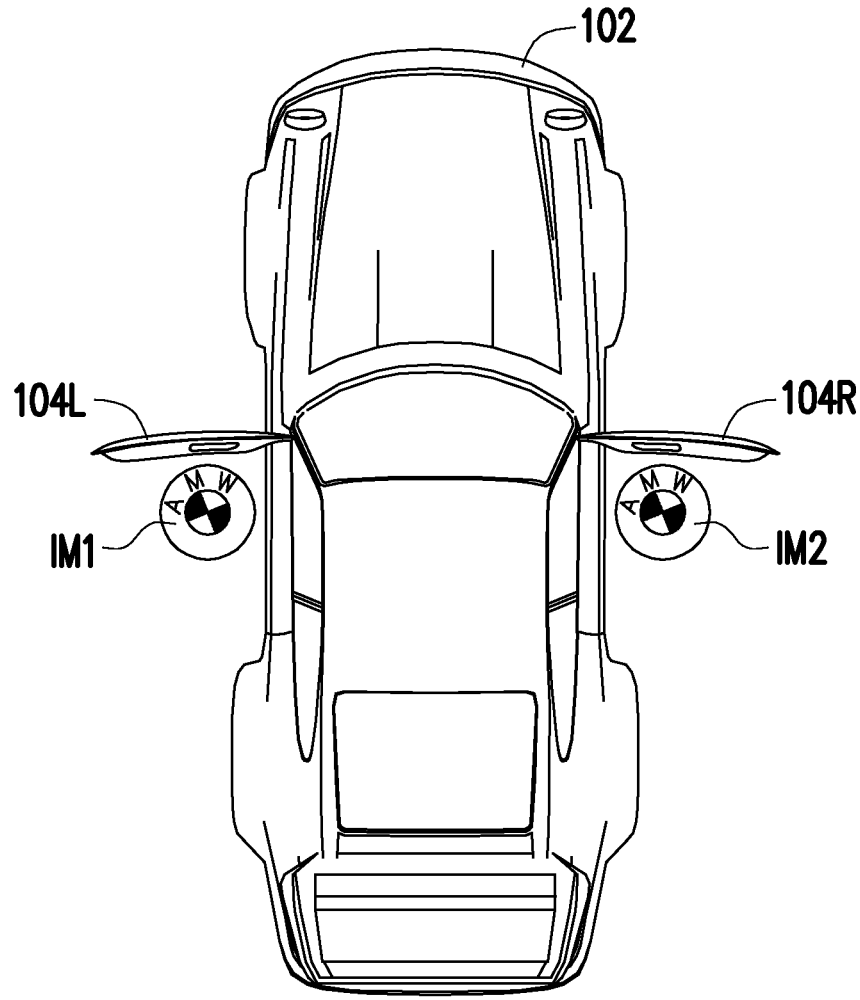
FIG. 3A is a schematic diagram of projection effects from different view angles according to another embodiment of the invention.

FIG. 3A is a schematic diagram of projection effects from different view angles according to another embodiment of the invention. Referring to FIG. 3A in combination with FIG. 1 and FIG. 2, when disposed on a left vehicle door 104L (for example, the first vehicle door), the projection apparatus 100 is represented as a projection apparatus 100L, and when disposed on a right vehicle door 104R (for example, the second vehicle door), the projection apparatus 100 is represented as a projection apparatus 100R. To provide a beautiful appearance and an intuitive visual effect, a first image IM1 projected by the projection apparatus 100L and an adjusted image IM2 projected by the projection apparatus 100R are the same. For example, relative to the vehicle 102, the adjusted image IM2 is the same as the first image IM1. Specifically, through an adjustment function of the projection apparatus 100R, image data of the first image IM1 forms the adjusted image IM2 after being adjusted (for example, mirror flipping or rotating for 180 degrees), and the adjusted image IM2 is then projected through the projection apparatus 100R. In brief, the first image IM1 is an image for a passenger getting off from the left vehicle door 104L, and the adjusted image IM2 is an image for a passenger getting off from the right vehicle door 104R. For the passenger getting off from the left vehicle door 104L and the passenger getting off from the right vehicle door 104R, the two images are the same. In other embodiments, the controller 120 may determine whether the projection apparatus 100 is disposed on the left vehicle door 104L or the right vehicle door 104R according to an opening operation of the vehicle door 104, and correspondingly project the first image IM1 or the adjusted image IM2.

More specifically, in FIG. 3A, texts, which are seen by the passenger getting off from the left vehicle door 104L, of the first image IM1 are texts "AMW" arranged from left to right. If the projection apparatus 100R also projects the first image IM1, the passenger getting off from the right vehicle door 104R may see inverse texts. Therefore, the controller 120 of the projection apparatus 100R may control the projection display apparatus 114 to display the adjusted image IM2, so that the passenger getting off from the right vehicle door 104R may obtain the same visual effect, and also see the texts "AMW" arranged from left to right. Relative to the vehicle 102, the first image IM1 and the adjusted image IM2 show the same image effect.

FIG. 3B is a schematic diagram of adjustment on the projection effects from different view angles in FIG. 3A. Referring to FIG. 3B, the projection apparatus 100L is disposed on the left vehicle door 104L, and the projection apparatus 100R is disposed on the right vehicle door 104R. In this embodiment, the projection display apparatus 114 includes a light valve module 116. The light valve module 116 includes any one of spatial light modulators such as a digital micro-mirror device (DMD), a liquid-crystal-on-silicon panel (LCOS Panel), or a liquid crystal panel (LCD). The light valve module 116 is configured to convert the illumination beam IB into a projection beam PB with an image content.

When the light valve module 116 of the projection apparatus 100L receives image data (which is also referred to as first image data) of the first image IM1, the first image IM1 is displayed on the light valve module 116 of the projection apparatus 100L. If the light valve module 116 of the projection apparatus 100R receives the same first image data, a mirrored first image IM1 or a symmetrical first image IM1 is displayed on the light valve module 116 of the projection apparatus 100R. It is because the projection apparatus 100L and the projection apparatus 100R are respectively disposed on the left vehicle door 104L and the right vehicle door 104R. Also, as a result, some material numbers need to be set as being used by the left vehicle door or the right vehicle door, which leads to burdens in production, stock, and even future maintenance. In addition, the passenger may be confused on directions of the video, picture, or brand.

Therefore, in the invention, image data provided to the light valve module 116 of the projection apparatus 100R is pre-compensated. For example, the first image IM1 is rotated for 180 degrees, or the first image IM1 is mirror-adjusted, to form image data of an adjusted image, and image data of the adjusted image is provided to the light valve module 116 of the projection apparatus 100R. In this case, an adjusted image IM2 which is projected by the projection apparatus 100R to the projection surface G is consistent with the first image IM1. However, the invention is not limited thereto, and is not limited to the light valve module 116 of the projection apparatus 100R disposed on the right vehicle door. In other embodiments, the light valve module 116 of the projection apparatus 100L disposed on the left vehicle door may also generate an adjusted image.

In this embodiment, back to FIG. 2, the projection apparatus 100 further includes a direction sensor 130. The direction sensor 130 is coupled to the controller 120, and is configured to sense an opening operation of the vehicle door 104 to generate a vehicle door opening signal. The controller 120 may be, for example, a central processing unit (CPU), or other programmable general-purpose or special-purpose microprocessors, a digital signal processor (DSP), a programmable controller, an application specific integrated circuits (ASIC), a programmable logic device (PLD), or other similar apparatuses or a combination of the apparatuses. The direction sensor 130 is, for example, a sensing apparatus such as an electronic compass, a magnetometer, a three axis gyroscope, or a three axis accelerometer. This is not limited in the invention. When the vehicle door 104 is pushed open, the direction sensor 130 senses a moving direction of the vehicle door 104 and generates a vehicle door opening signal. The controller 120 may determine whether the vehicle door 104 is the left vehicle door 104L or the right vehicle door 104R according to the vehicle door opening signal.

In this embodiment, the projection apparatus 100 further includes a memory 140. The memory 140 may be a random access memory, a hard disk, a flash memory, or any memory which may be configured to store data. The memory 140 is coupled to the controller 120 and the projection display apparatus 114, and is configured to store the first image data and the adjusted image data, where display contents of the first image data and the adjusted image data are the same. In this embodiment, the controller 120 reads the first image data or the adjusted image data from the memory 140 according to a determining result of the vehicle door 104, and controls the projection display apparatus 114 to generate the first image IM1 according to the first image data, or generate the adjusted image IM2 according to the adjusted image data.

In another embodiment, the memory 140 stores image data. The controller 120 reads the image data from the memory according to a determining result of the vehicle door 104, and controls the projection display apparatus 114 to correspondingly generate the first image IM1 or the adjusted image IM2 according to the same image data by means of image processing or by controlling the light valve module 116.

Figure 4:
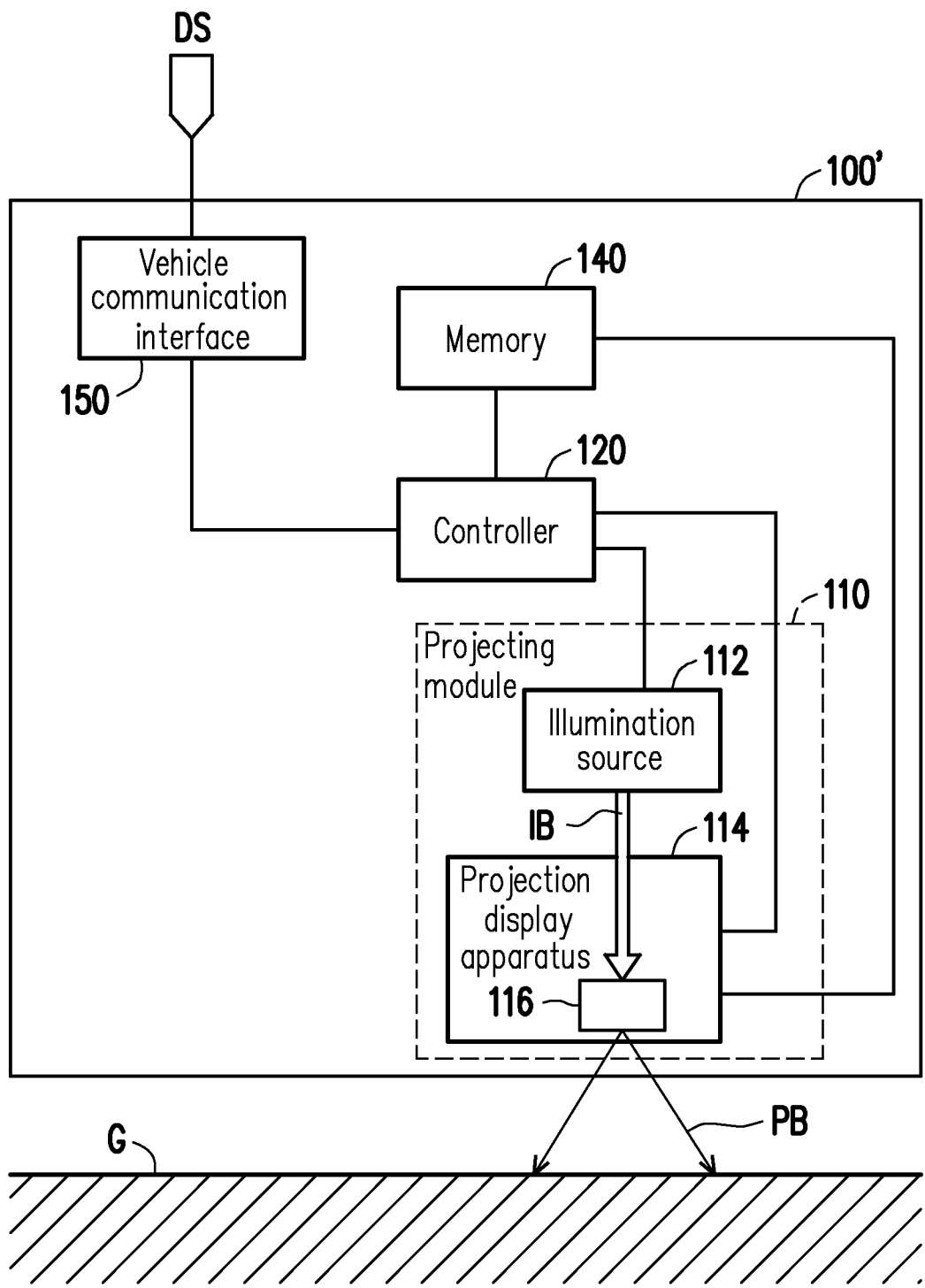
FIG. 4 is a schematic block diagram of a projection apparatus according to another embodiment of the invention.

FIG. 4 is a schematic block diagram of an effect of a projection apparatus according to another embodiment of the invention. Referring to FIG. 4, a projection apparatus 100' is applicable to the embodiments of FIG. 1 and FIG. 3A, and an implementation method of the projection apparatus 100' is the same as the implementation method of the projection apparatus 100. However, the projection apparatus 100' includes a vehicle communication interface 150 coupled to the controller 120. The vehicle communication interface 150 is, for example, a standard controller area network (CAN for short) interface, but the invention is not limited thereto. When a passenger (including a driver) needs to open the vehicle door 104, a vehicle control apparatus (not shown) of the vehicle 102 will obtain a vehicle door opening signal DS, and the controller 120 may receive the vehicle door opening signal DS from the vehicle control apparatus through the vehicle communication interface 150, and determine whether the vehicle door 104 is a first vehicle door or a second vehicle door according to the vehicle door opening signal DS. The vehicle control apparatus is, for example, a central processing unit (CPU) of the vehicle 102, or another control apparatus. Therefore, the projection apparatus 100' may not be mounted with the direction sensor 130, but receive the vehicle door opening signal DS through the vehicle communication interface 150.

Figure 3A:
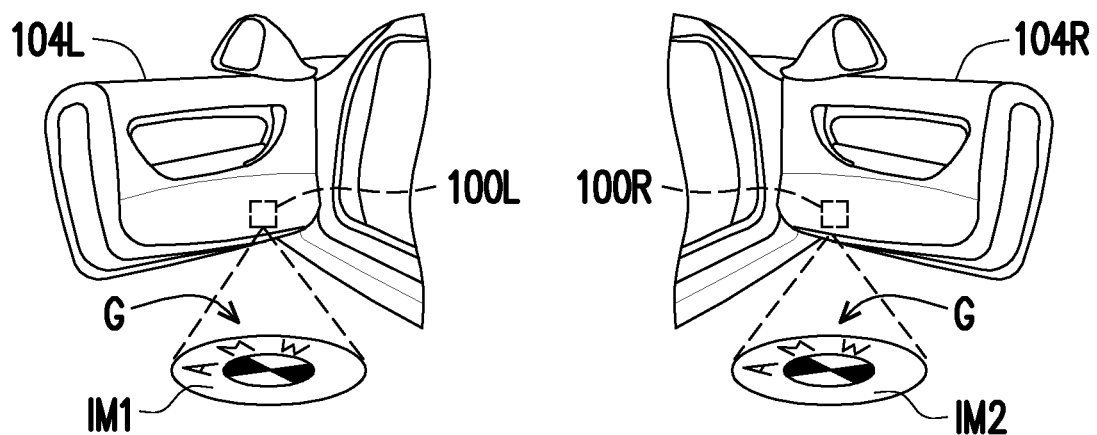
Figure 5:
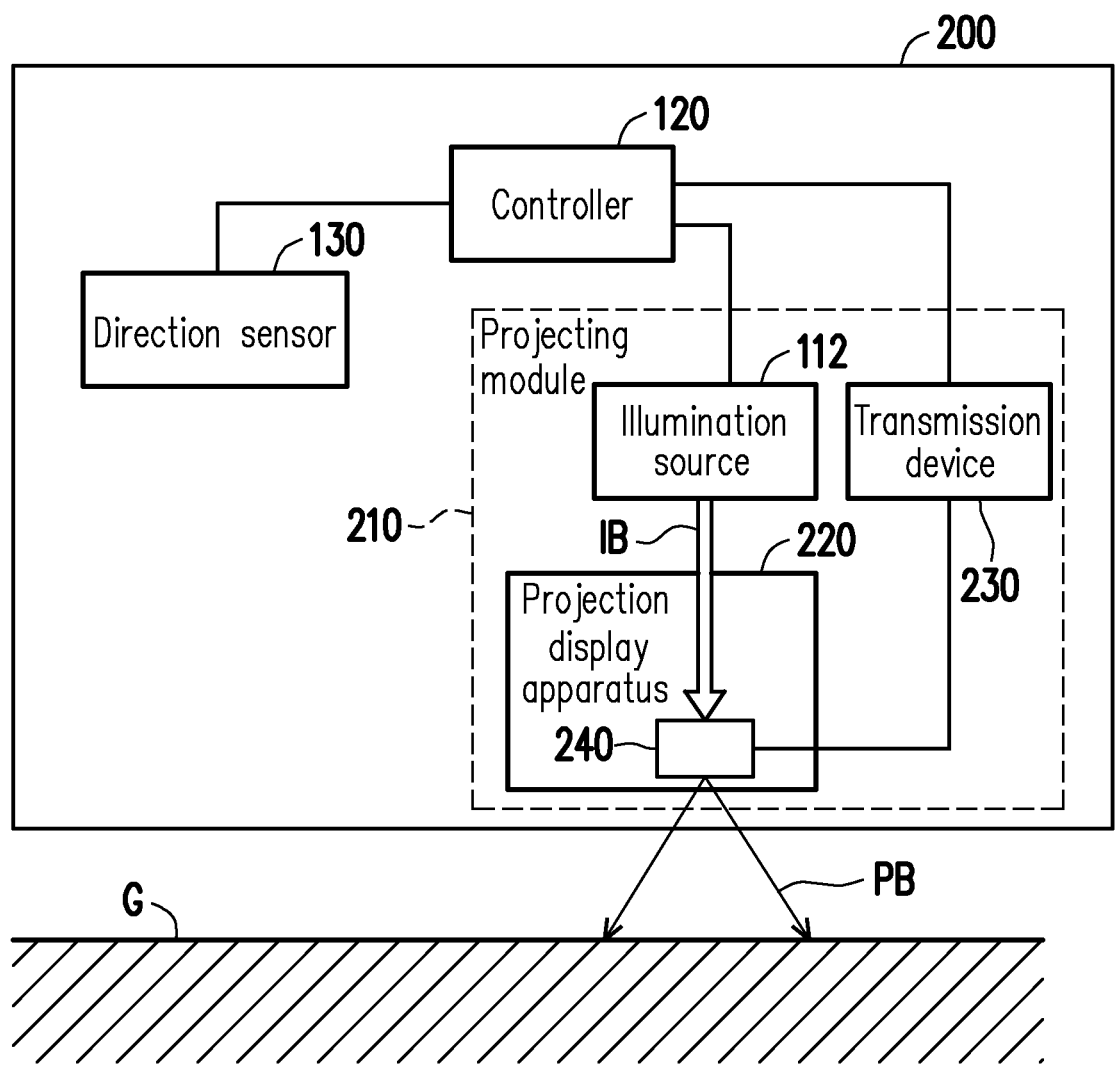
FIG. 5 is a schematic block diagram of a projection apparatus according to another embodiment of the invention.

FIG. 5 is a schematic block diagram of an effect of a projection apparatus according to another embodiment of the invention. A projection apparatus 200 is applicable to the embodiments of FIG. 1 and FIG. 3, and an implementation of the projection apparatus 200 is similar to the implementation of the projection apparatus 100. However, a structure of a projecting module 210 of the projection apparatus 200 is different from the projecting module 110. The projecting module 210 includes an illumination source 112, a projection display apparatus 220 and a transmission device 230, where the projection display apparatus 220 includes a mask 240 having a light-transmitting pattern. The mask 240 is disposed on the transmission path of the illumination beam IB, and the illumination beam IB forms a projection beam PB after passing through the light-transmitting pattern of the mask 240. For example, the projection display apparatus 220 may generate the projection beam PB by using a manner of slideshow.

The transmission device 230 is coupled to the controller 120 and the projection display apparatus 220, and includes, for example, a motor, a gear, or a belt. The transmission device 230 is configured to move or rotate the mask 240. In this embodiment, the controller 120 controls the transmission device 230, so that the mask 240 rotates by an angle, and correspondingly the first image IM1 or the adjusted image IM2 is generated. For example, if the controller 120 determines that the projection apparatus 200 is disposed on the left vehicle door 104L, the illumination beam IB forms the first image IM 1 after passing through the mask 240; and if the projection apparatus 200 is disposed on the right vehicle door 104R, the controller 120 rotates the mask 240 for 180 degrees on the projection surface G through the transmission device 230, and the illumination beam IB forms the adjusted image IM2 after passing through the rotated mask 240. The adjusted image IM2 is the same as the first image IM1 herein.

In another embodiment, the mask 240 includes a plurality of light-transmitting patterns to generate different projection images, for example, a first light-transmitting pattern and a second light-transmitting pattern. The controller 120 controls the transmission device 230 to select to have a part of the mask 240 including the first light-transmitting pattern, or a part of the mask 240 including the second light-transmitting pattern disposed on the transmission path of the illumination beam IB. Specifically, if the controller 120 determines that the projection apparatus 200 is disposed on the left vehicle door 104L, the transmission device 230, for example, enables the part of the mask 240 including the first light-transmitting pattern to be located on the transmission path of the illumination beam IB by means of extracting or slipping. The illumination beam IB passes through the first light-transmitting pattern to form the first image IM1. If the controller 120 determines that the projection apparatus 200 is disposed on the right vehicle door 104R, the transmission device 230, for example, enables the part of the mask 240 including the second light-transmitting pattern to be located on the transmission path of the illumination beam IB by means of extracting or slipping. The illumination beam IB passes through the second light-transmitting pattern and forms the adjusted image IM2.

It needs to be specifically noted that, the invention is not limited to the plurality of exemplary embodiments, and the embodiments are allowed to be combined properly. For example, in an embodiment, the projecting module may adjust projection contents in combination with the light valve module 116, the transmission device 230, and the mask 240.

Figure 6:
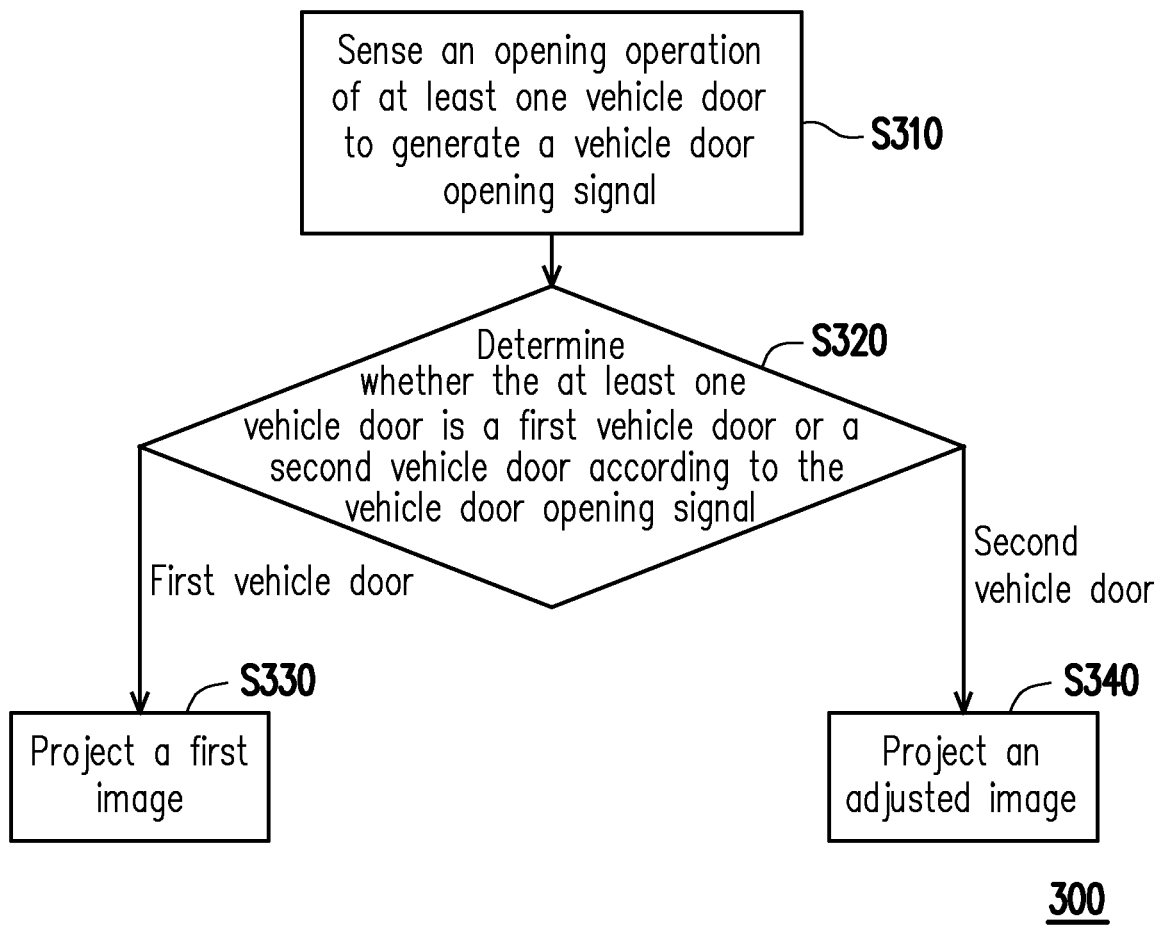
FIG. 6 is a flowchart of a control method of a projection apparatus according to another embodiment of the invention.

FIG. 6 is a flowchart of a control method of a projection apparatus according to another embodiment of the invention. A projection apparatus which may perform a control method 300 is disposed on a vehicle door of a vehicle, and a plurality of projection apparatuses may further be disposed on a plurality of vehicle doors. Therefore, the control method 300 may be applied to the foregoing embodiment. In step S310, an opening operation of at least one vehicle door is sensed to generate a vehicle door opening signal. Then, in step S320, a controller determines whether the vehicle door is a first vehicle door or a second vehicle door according to the vehicle door opening signal, to correspondingly project an image. Specifically, if a determining result of the controller is the first vehicle door, step S330 is performed, and if the determining result of the controller is the second vehicle door, step S340 is performed. In step S330, the controller controls a projection display apparatus to project a first image. In step S340, the controller controls the projection display apparatus to project an adjusted image. The first image and the adjusted image are the same. A person with ordinary knowledge in the art may obtain sufficient suggestions, instructions or descriptions according to the foregoing embodiments. Details are not described herein again.

Based on the foregoing, the projection apparatus and the control method of the projection apparatus of the embodiments of the invention may be disposed on any one of vehicle doors of a vehicle, and sense opening of the vehicle door to correspondingly project an image, so that passengers at different view angles may obtain optimal view experience. In addition, the projection apparatus provided by the invention has a simple structure, low production costs, and good application flexibility.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, configured to be disposed on a vehicle door of a vehicle, the projection apparatus comprising an illumination source, a projection display apparatus and a controller, wherein
    the illumination source is configured to provide an illumination beam,
    the projection display apparatus is disposed on a transmission path of the illumination beam, the projection display apparatus comprises a spatial light modulator and is configured to convert the illumination beam into a projection beam with an image content, and
    the controller is coupled to the projection display apparatus, determines whether the vehicle door is a first vehicle door or a second vehicle door according to an opening operation of the vehicle door, and correspondingly causes the projection beam to display an image.

2. The projection apparatus according to claim 1, wherein when the vehicle door is the first vehicle door, the projection beam is correspondingly caused to display the image, and the image is a first image, and
    when the vehicle door is the second vehicle door, the projection beam is correspondingly caused to display the image, and the image is an adjusted image, wherein the first image and the adjusted image are the same.

3. The projection apparatus according to claim 1, further comprising:
    a direction sensor, coupled to the controller, and configured to sense the opening operation of the vehicle door to generate a vehicle door opening signal, wherein the controller determines whether the vehicle door is the first vehicle door or the second vehicle door according to the vehicle door opening signal.

4. The projection apparatus according to claim 1, further comprising:
a vehicle communication interface coupled to the controller, wherein the controller receives a vehicle door opening signal from a vehicle control apparatus of the vehicle through the vehicle communication interface, and determines whether the vehicle door is the first vehicle door or the second vehicle door according to the vehicle door opening signal.

5. The projection apparatus according to claim 1, further comprising:
a transmission device coupled to the controller and the projection display apparatus, wherein
the projection display apparatus further comprises a mask having a light-transmitting pattern, and the illumination beam forms the projection beam after passing through the light-transmitting pattern of the mask, wherein
the controller controls the transmission device, so that the mask is rotated by an angle to generate the image correspondingly.

6. The projection apparatus according to claim 1, further comprising:
a transmission device coupled to the controller and the projection display apparatus, wherein
the projection display apparatus further comprises a mask having a first light-transmitting pattern and a second light-transmitting pattern, wherein
the controller controls the transmission device to select to have a part of the mask comprising the first light-transmitting pattern or a part of the mask comprising the second light-transmitting pattern disposed on the transmission path of the illumination beam, wherein the illumination beam forms a first image after passing through the first light-transmitting pattern of the mask, and the illumination beam forms an adjusted image after passing through the second light-transmitting pattern of the mask.

7. The projection apparatus according to claim 2, further comprising:
a memory, coupled to the controller and the projection display apparatus, and configured to store first image data and adjusted image data, wherein
the controller reads the first image data or the adjusted image data from the memory according to a determining result, and controls the projection display apparatus to generate the first image according to the first image data or generate the adjusted image according to the adjusted image data.

8. The projection apparatus according to claim 2, further comprising:
a memory, coupled to the controller and the projection display apparatus, and configured to store image data, wherein
the controller reads the image data from the memory according to a determining result, and controls the projection display apparatus to correspondingly generate the first image or the adjusted image according to the image data.

9. The projection apparatus according to claim 2, wherein the first vehicle door and the second vehicle door are located on different sides of the vehicle, and
when the projection apparatus is disposed on the first vehicle door, the first image is projected, and when the projection apparatus is disposed on the second vehicle door, the adjusted image is projected, wherein a display content of the first image and a display content of the adjusted image are respectively projected at lower positions adjacent to the first vehicle door and the second vehicle door.

10. A control method of a projection apparatus, wherein the projection apparatus is configured to be disposed on a vehicle door of a vehicle, the projection apparatus comprises an illumination source and a spatial light modulator, and the control method comprises:
sensing an opening operation of the vehicle door to generate a vehicle door opening signal; and
determining whether the vehicle door is a first vehicle door or a second vehicle door according to the vehicle door opening signal, to correspondingly project, by the projection apparatus, an image,
wherein the step of projecting, by the projection apparatus, the image comprises:
providing an illumination beam through the illumination source; and
converting the illumination beam into a projection beam with an image content through the spatial light modulator.

11. The control method according to claim 10, wherein when the vehicle door is the first vehicle door, the image is displayed correspondingly, and the image is a first image, and
when the vehicle door is the second vehicle door, the image is displayed correspondingly, and the image is an adjusted image, wherein the first image and the adjusted image are the same.

12. The control method according to claim 11, wherein the projection apparatus further comprises a mask having a light-transmitting pattern, a transmission device, and a controller, wherein the step of projecting, by the projection apparatus, the first image or the adjusted image comprises:
controlling, through the controller, the transmission device to rotate the mask according to the vehicle door opening signal, so that the illumination beam forms the first image or the adjusted image correspondingly after passing through the light-transmitting pattern of the mask.

13. The control method according to claim 11, wherein the projection apparatus further comprises a mask having a first light-transmitting pattern and a second light-transmitting pattern, a transmission device, and a controller, wherein the step of projecting, by the projection apparatus, the first image or the adjusted image comprises:
controlling, through the controller, the transmission device to move the mask according to the vehicle door opening signal, to select to have a part of the mask comprising the first light-transmitting pattern or a part of the mask comprising the second light-transmitting pattern disposed on a transmission path of the illumination beam, wherein the illumination beam forms the first image after passing through the first light-transmitting pattern of the mask, and the illumination beam forms the adjusted image after passing through the second light-transmitting pattern of the mask.

14. The control method according to claim 11, wherein the projection apparatus further comprises a projection display apparatus, a memory, and a controller, wherein the step of projecting, by the projection apparatus, the first image or the adjusted image comprises:
reading, through the controller, first image data or adjusted image data from the memory according to the vehicle door opening signal, and controlling the projection display apparatus to generate the first image according to the first image data or generate the adjusted image according to the adjusted image data.

15. The control method according to claim 11, wherein the projection apparatus further comprises a projection display apparatus, a memory, and a controller, wherein the step of projecting, by the projection apparatus, the first image or the adjusted image comprises:

reading, through the controller, image data from the memory according to the vehicle door opening signal, and controlling the projection display apparatus to correspondingly generate the first image or the adjusted image according to the image data.

16. The control method according to claim 11, wherein the first vehicle door and the second vehicle door are located on different sides of the vehicle, and when the projection apparatus is disposed on the first vehicle door, the projection apparatus projects the first image, and when the projection apparatus is disposed on the second vehicle door, the projection apparatus projects the adjusted image, wherein a display content of the first image and a display content of the adjusted image are respectively projected at lower positions adjacent to the first vehicle door and the second vehicle door.

\* \* \* \* \*